United States Patent [19]

Grosser

[11] 4,238,089
[45] Dec. 9, 1980

[54] AIMING AND GUIDING DEVICE FOR REMOTE CONTROLLED, JET PROPELLED PROJECTILES

[75] Inventor: Heinrich Grosser, Vellmar, Fed. Rep. of Germany

[73] Assignee: Thyssen Industrie Aktiengesellschaft, Kassel, Fed. Rep. of Germany

[21] Appl. No.: 3,608

[22] Filed: Jan. 15, 1979

[30] Foreign Application Priority Data

Jan. 16, 1978 [DE] Fed. Rep. of Germany ....... 2801694

[51] Int. Cl.$^3$ .............................................. F41G 7/26
[52] U.S. Cl. ................................................. 244/3.13
[58] Field of Search ...................................... 244/3.13

[56] References Cited

U.S. PATENT DOCUMENTS

| 2,930,894 | 3/1960 | Bozeman ............................ 244/3.13 |
| 4,111,384 | 9/1978 | Cooper ............................... 244/3.13 |

FOREIGN PATENT DOCUMENTS 1203892 9/1970 United Kingdom .................... 244/3.13

*Primary Examiner*—Charles T. Jordan
*Attorney, Agent, or Firm*—Becker & Becker, Inc.

[57] ABSTRACT

An aiming and guiding device for remote controlled, jet propelled projectiles. The device is arranged on an armor plating. The aiming portion of the device comprises a launching stand, and a guiding portion, which is azimuthally pivotally mounted in the armor plating, has an optical sight for picking up and tracking the target, as well as a position-finding apparatus which serves for the remote control of the projectile in the direction of the target and is fixedly assembled with the optical sight. Both of these parts of the guiding portion are accommodated in a single housing. The housing has an entry window for the optical axes of the sight and position-finding apparatus, which axes are oriented parallel to one another, as well as a common head mirror. After the projectile has been launched, the housing is movable independent of the launching stand. The head housing is arranged on the azimuthally pivotal support housing during the initial target approach of the projectile. The head housing is itself azimuthally pivotal relative to the support housing and has an entry window and a mirror, which is tiltable about a horizontal axis, for the optical axis (infrared sight axis) of the position-finding apparatus. Devices are provided by means of which the two optical sights are adjustable independent of one another and, in conformity with the angle between the infrared sight axis and the optical sight axis, such movements are initiated that this angle becomes zero.

3 Claims, 4 Drawing Figures

AIMING AND GUIDING DEVICE FOR REMOTE CONTROLLED, JET PROPELLED PROJECTILES

The present invention relates to an aiming and guiding device for remote controlled, jet propelled projectiles. The device is arranged on an armor plating. The aiming portion of the device comprises a launching stand, and the guiding portion, which is azimuthally pivotally mounted in the armor plating, has an optical sight for picking up and tracking the target, as well as a position-finding apparatus which serves for the remote control of the projectile in the direction of the target and is fixedly assembled with the optical sight. Both of these parts of the guiding portion are accommodated in a single housing. The housing has an entry window for the optical axes of the sight and position-finding apparatus, which axes are oriented parallel to one another, as well as a common head mirror (Kopfspiegel). After the projectile has been launched, the housing is movable independent of the launching stand.

The term "armor plating" in the present invention refers to both stationary shelters as well as to the armor plating of vehicles.

With remote controlled, jet propelled projectiles, the soldier who operates the aiming and guiding device observes the target with the optical sight and simultaneously navigates the launched projectile relative to the sight line. The launched projectile is preferably guided in accordance with the line-of-sight method. In this connection, the optical axis of the sight is continuously oriented toward the target or guided toward it, while the projectile which is flying toward this target is picked up by the infrared position-finding apparatus and the trajectory or flight path thereof is corrected by guide signals.

Aiming and guiding devices, according to which the guiding portion is movable by itself after the projectile is launched, are known.

According to one embodiment, after picking up the target with a telescope, a launching ramp for the projectile, which ramp is spaced from the telescope, is swiveled out of a zero angle position by releasing an electrical sequence control into the angular section of the sight line of the telescope, and is fixed in this new position for a short period of time for the launching of the projectile located on the launching ramp. During the search for the target, that is, also prior to launching the projectile, the telescope is movable separately of the launching ramp. By the use of contact switches distributed over the periphery of the telescope and the launching ramp, and the electrical device connected therewith, the entire unit is expensive, complicated, and subject to disruption and interference. A different problem in this connection is the picking up of the projectile, which is launched from the launching ramp, during the flight of the projectile in the direction of the target.

According to another aiming and guiding device, the guiding portion is arranged in a support which can be adjusted laterally and as to height. The mounts for the projectiles are also rigidly connected to this support. So that after picking up the target by means of the optical sight of periscope construction, the mounts with the projectiles do not have to be swiveled into the sight line, the mounts and the guiding portion are coupled to one another during the search for the target and the aiming operation. Due to the coupling of the aiming and guiding device, the dead weights of the mounts and the projectiles located thereon must be constantly dragged along during the commonly performed movements of the aiming and guiding device until the projectile is launched. A drawback to this construction is the strict coordination of the two optical axes of the sight and position-finding apparatus which are rigidly mounted together into one unit. As a result, the projectile must constantly be launched in a direction which assures that it will quickly pass into the relatively small field of the position-finding apparatus, because only then does the automatic guiding of the projectile take place.

It is an object of the present invention to provide an aiming and guiding device of the above mentioned general type with a nonadjustable launching stand, according to which the transfer of the launched projectile into the sight line is assured no matter what angle the sight line forms with the launch direction of the projectile at launch.

This object, and other objects and advantages of the present invention, will appear more clearly from the following specification in connection with the accompanying drawings, in which.

The present invention is characterized primarily in that a head housing is arranged on the azimuthally pivotable support housing during the first or initial target approach or homing phase of the projectile. The head housing is itself azimuthally pivotal relative to the support housing and has an entry window and a mirror, which is tiltable about a horizontal axis, for the optical axis (infrared sight axis) of the position-finding apparatus. Devices are provided by means of which the two optical sights are adjustable independent of one another and, in conformity with the angle between the infrared sight axis and the optical sight axis, such movements are initiated that said angle becomes zero.

Pursuant to the present invention, it is even possible for a soldier to launch a projectile against a target that he has discovered if a relatively large angle exists between the launching stand axis (direction of launch) and the sight line (optical sight axis).

Although it is known to correct the flight path or trajectory of a projectile after launch by guide signals in such a way that during the initial flight phase it is held very close along the optical sight line and is only guided toward the sight line shortly before the target. With this system, however, a wide angle field of vision is provided, in which connection the guiding of the projectile toward its required trajectory takes place only then when it has entered the small angle field of the position-finding apparatus.

Pursuant to a specific embodiment of the present invention, devices which serve for the movement to synchronize the two sight axes include mechanical elements, pivotal mirrors, drive motors, and switching elements.

A preferred embodiment of the present invention consists in that during synchronization of the two sight axes in the azimuth and in elevation, the beam course of the infrared sight axis, along with the beam course of the optical sight axis, can be introduced by head mirrors and beam splitters located in the support housing. From there, the beam course of the infrared sight axis can be diverted to the infrared position-finding apparatus by a hinged mirror.

Figure 1:
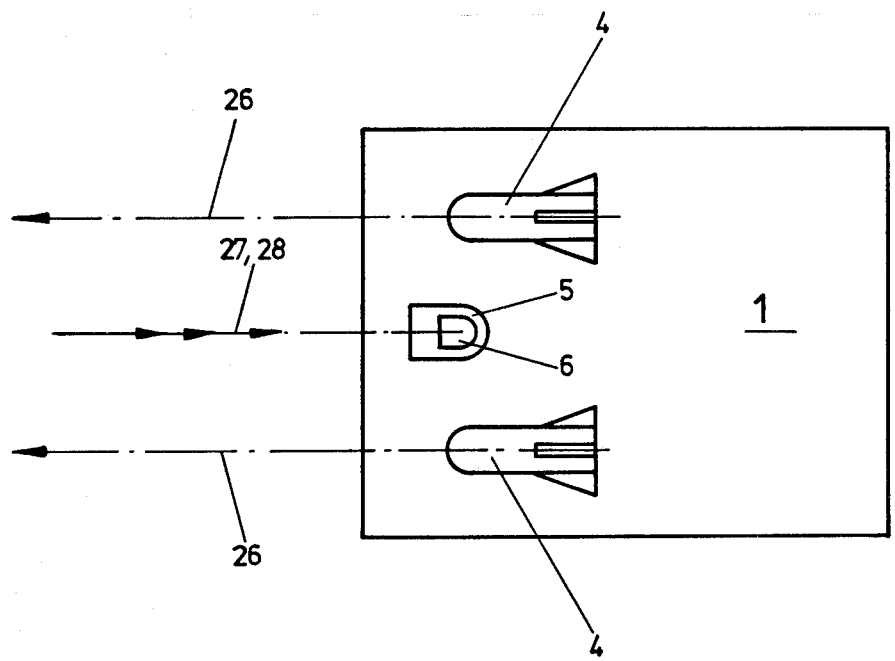
FIG. 1 is a top view of the aiming and guiding device according to the present invention in the ready position.
Figure 2:
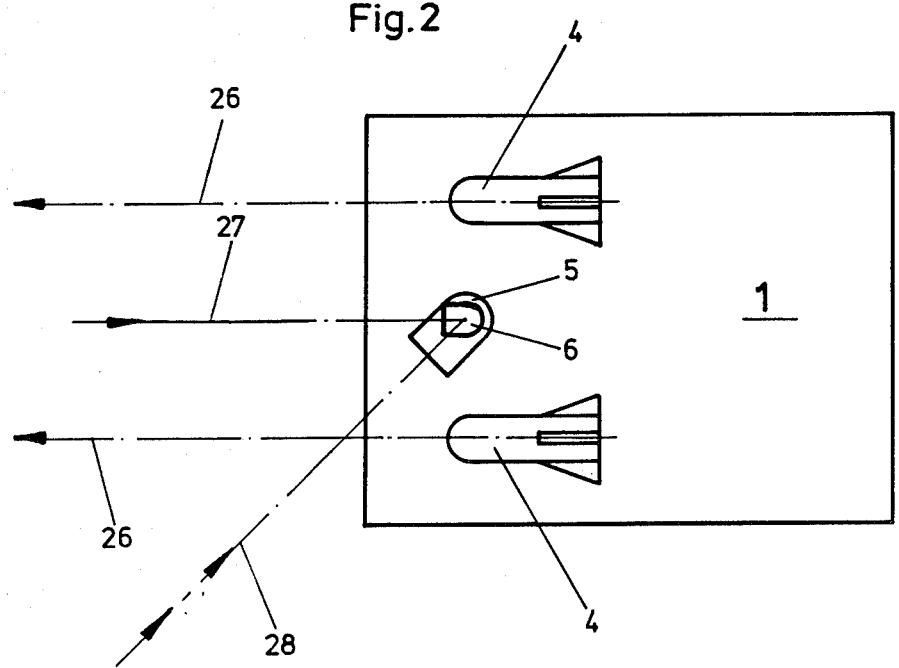
FIG. 2 is a view similar to that of FIG. 1, with the optical sight of the guiding portion being directed toward the sighted target and the infrared sight being pointed in the launching direction of the projectile.

Referring now to the drawings in detail, FIGS. 1 and 2 show a launching stand with a projectile 4 respectively located on an armor plating 1 on both sides of a guiding device.

Figure 3:
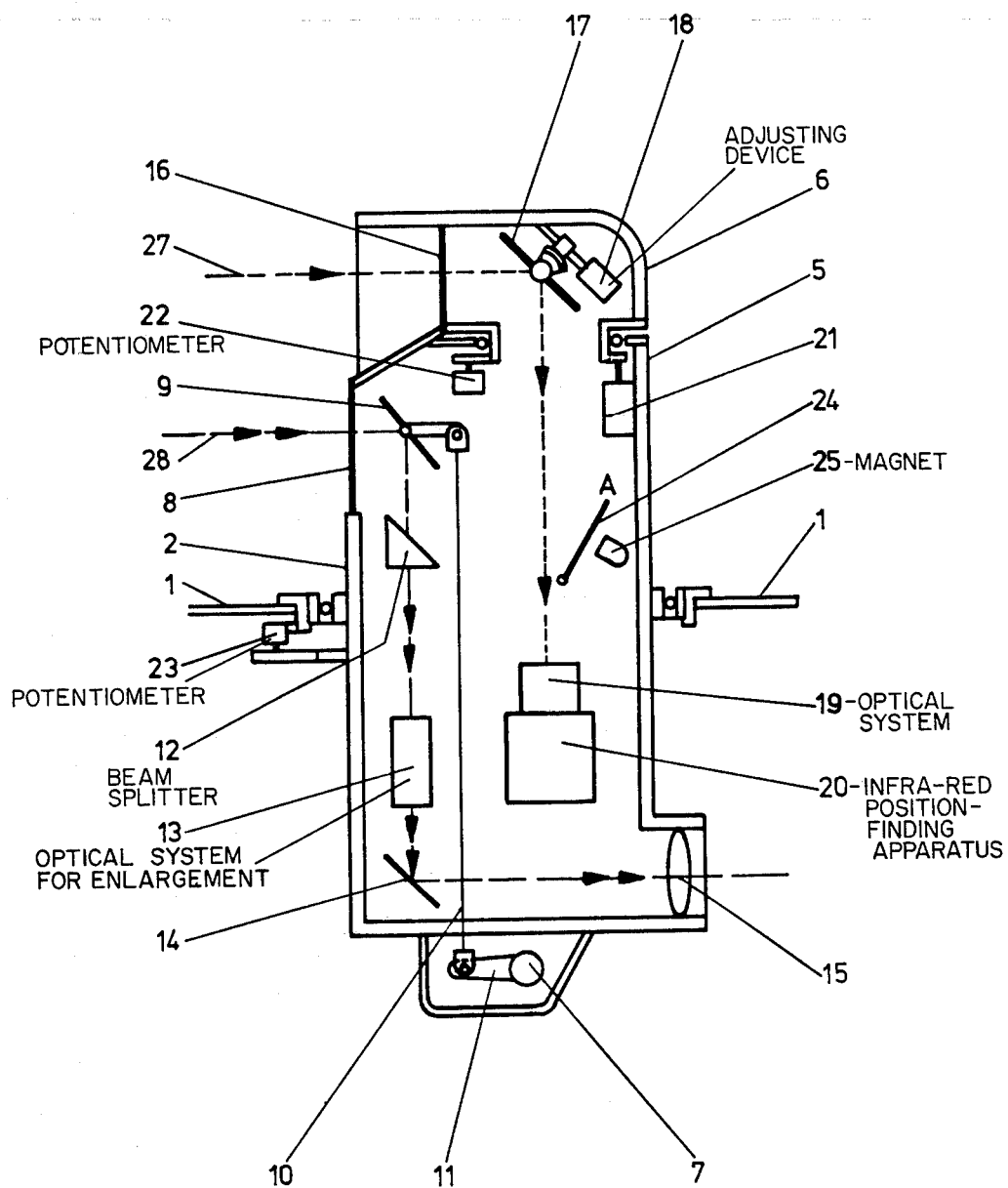
FIGS. 3 and 4 are longitudinal sections of the guiding portion of the device with the optical and infrared sights pointed in the same direction during the transfer phase by the entry of the infrared rays from the outside into the head housing and into the support housing.
Figure 4:
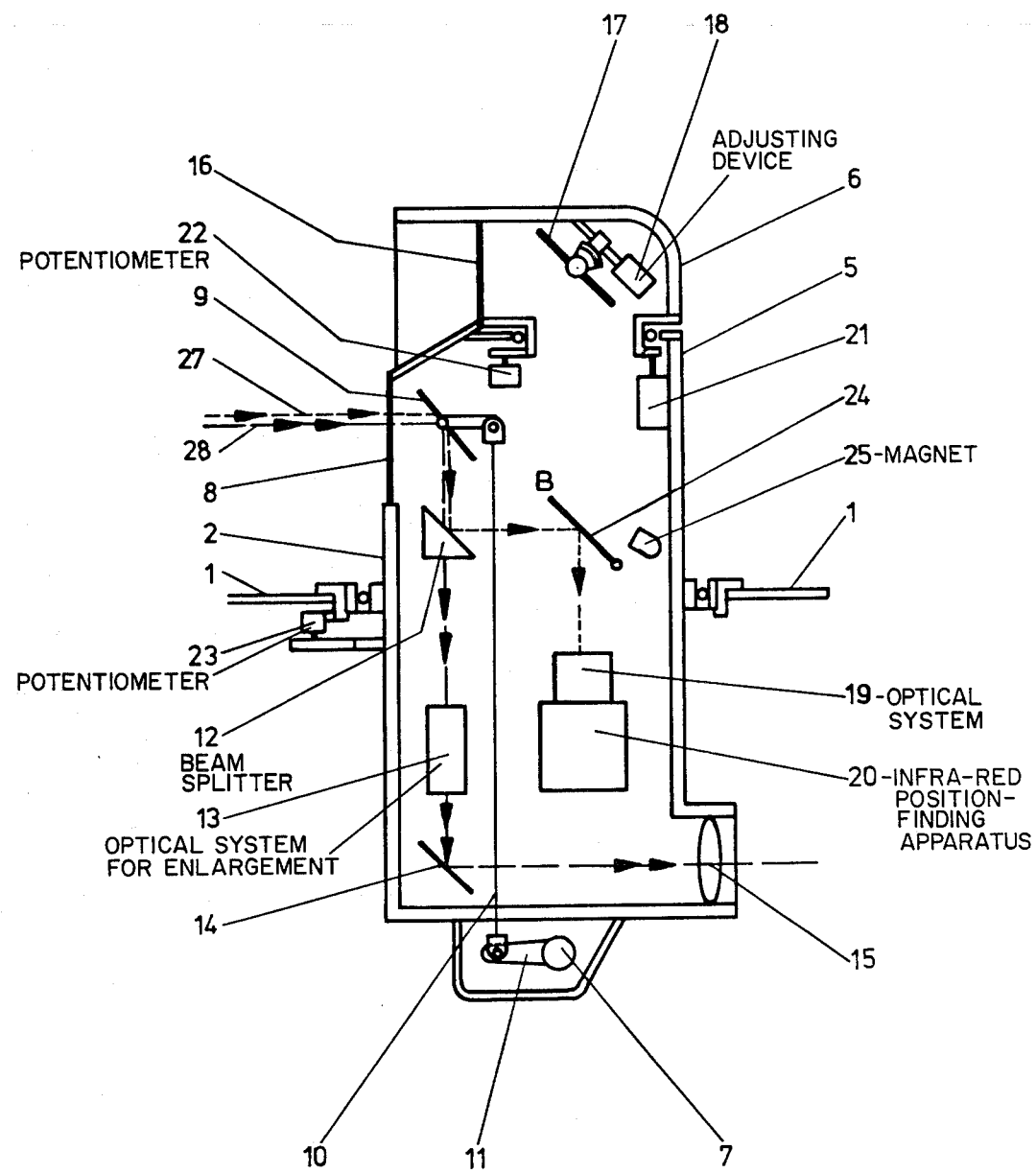

As clearly shown in FIGS. 3 and 4, the guiding portion 2 of the device of the present invention essentially comprises a tubular support housing 5 which is azimuthally pivotally mounted in the armor plating 1. An optical sight of periscope construction and an infrared position-finding apparatus are accommodated in the support housing 5, and a head housing 6, which itself is azimuthally pivotal relative to the support housing 5, is arranged thereupon. Two hand grips 7, which on opposite sides are directed outwardly, are mounted at the lower end of the support housing 5. With these two hand grips, one of which is at the same time constructed as a control grip, the entire device can be rotated about the azimuthal axis. At the upper end, the support housing 5 is provided with an entry window 8, behind which is located a pivotal head mirror 9 which for the high elevation angle adjustment is connected to the rotatable hand grip 7 by a mechanical linkage 10 and a handle 11. A beam of light, which arrives in the periscope through the entry window 8, strikes a beam splitter 12 through the intervention of the pivotal head mirror 9 and further strikes an ocular or eyepiece 15 through the intervention of an optical system for enlargement 13 and a surface or deflector mirror 14.

The head housing 6 is likewise equipped with an entry window 16, behind which is located a pivotal mirror 17 which is provided with an adjusting device 18 for adjusting the elevation angle. A beam, which through the window 16 strikes the pivotal mirror 17 which is arranged in the head housing 6, arrives, through the intervention of an optical system 19 arranged in the support housing 5, at the infrared position-finding apparatus 20 which is accommodated in the support housing and serves to guide the projectile. The azimuthal rotation of the head housing 6, with the mirror 17 and the adjusting device 18, relative to the support housing 5 is effected in a manner known per se by means of a drive motor 21 and a mechanical transmission. A potentiometer 22 is arranged between the head housing 6 and the support housing 5. A further potentiometer 23 is located between the support housing 5 and the armor plating 1. In the support housing 5, above the optical system 19 and opposite the beam splitter 12, is located a hinged mirror 24 which is movable about a horizontal axis and is actuated by a magnet 25.

The manner of operation is as follows:

The projectiles 4 which are located in a protected manner under the armor plating 1 are raised above the armor plating by launching stands known per se, are tilted into a fixed position, and are individually launched. During this raising movement, the head housing 6 of the guiding portion 2, which housing 6 is located azimuthally rotatably on the support housing 5, is moved by the drive motor 21 in such a way that the sight axis 27, which operates with infrared rays to pick up the launched projectile, extends parallel to the launching direction 26 of the projectile independent of the respective direction of the optical sight axis 28. When the ready position of the head housing 6 is achieved, the drive motor 21 is turned off. The signalling and maintaining of the azimuthal turning angle between the head housing 6 and the support housing 5 is effected by the potentiometers 22 and 23.

During rotation of the head housing 6, the mirror 17, which is located in this housing, is also pivoted into the angle of elevation fixed to the projectile launch direction 26 by the adjusting device 18. The projectile 4 is now launched and passes into the pickup region of the sight axis 27 which operates with infrared rays. The infrared rays are reflected by the pivotal mirror 17 and, by means of the optical system 19 located in the support housing 5, arrive at the position-finding apparatus 20 in which the signals which are necessary for guiding the launched projectile are generated. In this connection, the hinged mirror 24 located between the mirror 17 and the optical system 19 takes the position A (FIG. 3). Finally, the drive motor 21 for the rotational movement of the head housing 6 about the azimuthal axis is again started, and the housing 6 is moved in the direction of the optical sight axis 28, so that the angle defined by the infrared sight axis 27 and the optical sight axis 28 and specified by the face value of the potentiometers 22 and 23 becomes zero. As soon as the two sight axes 27 and 28 are located in a vertical plane, the drive motor 21 for the azimuthal turning movement of the head housing 6 is turned off. During the last mentioned starting of the drive motor 21, the adjusting device 18 of the pivotal mirror 17 is also actuated. After parallel coinciding of the angle of elevation of the infrared sight axis 27 and the optical sight axis 28, the adjusting device 18 is also turned off.

The comparison of the parallel nature of the sight axes 27 and 28 is also effected in this instance with the aid of potentiometers, which are mounted on the axes of the mirrors 9 and 17.

When the infrared sight axis 27 and the optical sight axis 28 extend in a vertical plane and are horizontally parallel to one another, the hinged mirror 24 is pivoted by an electrical signal out of its previous position A (FIG. 3) into position B (FIG. 4). The scanning beams of the infrared sight axis 27 now also arrive through the entry window 8 of the support housing 5 into this housing 5 and, together with the beams of light of the optical sight axis 28, strike the head mirror 9, are reflected, and are received combined by the beam splitter 12. The beams of the infrared sight axis 27 pass from the beam splitter 12 into the optical system 19 and the position-finding apparatus 20 by means of the hinged mirror 24, and the beams of the optical sight axis 28, as previously, pass to the eyepiece 15 by means of the optical system for enlargement 13 and the surface or deflector mirror 14. As soon as the beams of the infrared sight axis 27 pass through the entry window 8 into the support housing 5, the head housing 6, with the pivotal mirror 17 located therein, returns to its ready position.

It is important that during launching of the projectile, the infrared sight axis 27 have a definite direction relative to the launching direction 26 of the projectile 4. Mechanical or electrical interlocking systems of customary construction (not shown) lock the movements about the azimuthal and elevation axes during the launch of the projectile for a short period of time.

The present invention is, of course, in no way restricted to the specific disclosure of the drawings, but also encompasses any modifications within the scope of the appended claims.

What I claim is:

1. An aiming and guiding device for remote controlled, jet propelled projectiles, said device being arranged in an armor plating and comprising:

an aiming portion, including a launching stand; and a guiding portion which is azimuthally pivotally mounted in said armor plating and which includes:

an optical sight, having an optical sight axis for picking up and tracking a target;

a position-finding apparatus, having an infrared sight axis for the remote control of said projectile in the direction of said target, said optical sight and said position-finding apparatus being fixedly assembled together and being accommodated in a single support housing having a first entry window for the optical axes of said sight and said position-finding apparatus, which axes are oriented parallel to one another, and having a common head mirror, said support housing being azimuthally pivotal independent of said launching stand after launch of a projectile;

a head housing azimuthally pivotally mounted on said support housing and including a second entry window and a mirror, which is tiltable about a horizontal axis, for said infrared sight axis; and means for adjusting said optical sight and said position-finding apparatus independent of one another and, in conformity with the angle between said optical sight axis and said infrared sight axis, for adjusting said angle to zero.

2. A device according to claim 1, in which said means for adjusting said optical sight and said position-finding apparatus and for synchronizing both of said optical axes comprises mechanical elements, pivotal mirrors, drive motors and adjusting devices, and switching elements.

3. A device according to claim 2, in which, during synchronization of both of said optical axes in the azimuth and in elevation, said support housing includes a beam splitter for, together with said head mirror, introducing the beam courses of both said infrared sight axis and said optical sight axis into said device, and also includes a hinged mirror for diverting the beam course of just said infrared sight axis to said position-finding apparatus.

* * * * *